3,099,666
BIMETALLIC CARBONYL HALIDE COMPOSITIONS
Richard D. Gorsich, Baton Rouge, La., assignor to Ethyl Corporation, New York, N.Y., a corporation of Virginia
No Drawing. Filed Dec. 14, 1960, Ser. No. 75,671
18 Claims. (Cl. 260—429)

This invention relates to novel and useful bimetallic compounds, specifically, tin manganese carbonyl halides, and to novel methods for the preparation of such compounds.

Heretofore certain organic and inorganic metal carbonyls have been suggested as gasoline additives primarily for the purpose of increasing the antiknock ratings of the gasolines. For example, manganese pentacarbonyl is a highly effective antiknock agent both when used as the sole antiknock agent and when used in combination with alkyllead antiknock agents, e.g., tetraethyllead. Effective as many of these carbonyl compounds may be, however, they all exhibit certain shortcomings in use which materially decrease their value for the stated purpose. For example, their use is generally associated with more or less severe engine wear and with a shortened useful life of the exhaust valves. It is a specific and valuable property of the compounds of this invention that they minimize these particular problems; as a result of their unusual chemical structure they do have good antiknock properties and yet they do not have the above substantial adverse effects of markedly increasing engine wear and drastically impairing exhaust valve durability.

Accordingly, it is an object of this invention to provide new and useful tin manganese carbonyl compounds. Another object is to provide novel and effective methods for the preparation of such compounds. A further object is to provide compounds which exhibit the good antiknock effectiveness of manganese carbonyls but which are free from the marked disadvantages of shortened valve life and high engine wear associated with the use of prior metallic carbonyls in general. Other important objects of this invention will become apparent hereinafter.

The novel and useful compositions of this invention are bimetallic compounds of the general formula $$R_mX_{4-m-p}Sn[Mn(CO)_5]_p$$

In this formula R is a hydrocarbon group, preferably an alkyl, aryl, cycloalkyl, aralkyl, or alkaryl radical containing up to about 18 carbon atoms; X is a halogen atom; $m$ is an integer from 0 to 2, inclusive; and $p$ is 1 when $m$ is 2 and is an integer from 1 to 2, inclusive, when $m$ is less than 2. Of these compounds, those wherein X represents chlorine or bromine are preferred because of the ready availability, economy and ease of handling of the halogens used, directly or indirectly, in their synthesis.

The compounds of this invention are, in general, solids which melt at low or moderate temperatures, are stable at ordinary temperatures and can readily be prepared and stored without special precautions for future use. They are white or faintly yellow in color and are distinctly crystalline in habit. These compounds in general are soluble in organic solvents such as aliphatic hydrocarbons, e.g., n-hexane and petroleum naphtha, and in halohydrocarbons, e.g., carbon tetrachloride and methylene dichloride. Certain of the compounds are soluble in alcohols such as ethanol, at least in amounts sufficient to permit fractional crystallization therefrom, but tend to have poor solubility in pure aromatics such as benzene and in acetone.

Those compounds of this invention whose structure is characterized by the presence of organic radicals are preferred embodiments of the invention because, being less strongly polar than the purely inorganic compounds, they are lower melting and are more highly soluble in organic solvents, with the result that they are more readily susceptible to purification than are the purely inorganic compounds. These organic compounds comprise two types, namely, one group having the empirical formula $$RX_2SnMn(CO)_5$$

and a second group having the empirical formula $$R_2XSnMn(CO)_5$$

wherein R and X have the meanings assigned above.

The novel compounds of this invention are of considerable value in the chemical and allied arts. For example, they are potent antiknock agents and in this utility they are versatile agents in that they are highly effective in both unleaded and conventional leaded gasolines made from a wide variety of base stocks. An additional feature of the present compounds is that when they are used as antiknock agents, the engine wear and exhaust valve durability characteristics of the engine are not markedly impaired, which is the situation when using metallic carbonyls known heretofore.

The compounds of this invention are also useful in combatting fungi when applied to the locus thereof. When used in controlling or eliminating fungi which infest vegetation, the compounds of this invention in general have the advantage of relatively low phytotoxicity.

There are two general methods of preparing the compounds of this invention, namely (1) the halogenation process, wherein an organotin manganese pentacarbonyl is reacted with elemental halogen or with hydrogen halide and (2) the redistribution process, wherein an organotin manganese pentacarbonyl is reacted with a halotin manganese pentacarbonyl or with an organohalotin manganese pentacarbonyl. Consequently, these two processes constitute embodiments of this invention.

HALOGENATION PROCESS

In the halogenation process, the organotin manganese pentacarbonyl reactant is represented by the general formula $$R_{m+1}Sn[Mn(CO)_5]_{3-m}$$

wherein R is an alkyl, aryl, cycloalkyl, aralkyl or alkaryl radical containing up to about 18 carbon atoms and $m$ is 1 or 2. In this process, one or more of the R groups is replaced by halogen derived from the free halogen or hydrogen halide reactant. The halogen used is, preferably, chlorine, bromine or iodine, because these are strong enough reactants to replace the organic group but not so strong as to break the tin-manganese bond. Of these, chlorine and bromine are particularly preferred because of their availability and economy.

In the halogenation process involving reaction of hydrogen halide with the organotin manganese pentacarbonyl, the halogen of the hydrogen halide can be fluorine, chlorine, bromine or iodine. Here again chlorine and bromine are preferred for the reasons just noted.

The nature of the product obtained in the halogenation process depends on the halogen reactant used, on the ratio of the reactants and on the reaction temperature.

When the halogen reactant is free halogen, more extensive replacement of the organo groups of the organotin manganese pentacarbonyl is favored by decreased atomic weight of the halogen, by increased ratio of halogen to carbonyl and by increased reaction temperature. Thus, in reaction at room temperature, the use of excess chlorine or bromine leads to complete replacement of the organo groups with halogen, forming trichlorotin manganese pentacarbonyl and tribromotin manganese pentacarbonyl, respectively. If the reaction temperature is reduced to 0° C., or if the proportion of halogen is reduced to that stoichiometrically equivalent to the carbonyl, it is possible to replace two-thirds of the organo groups with halogen, forming such compounds as phenyldichlorotin manganese pentacarbonyl and phenyldibromotin manganese pentacarbonyl, respectively. When iodine is the halogen used, not more than two-thirds of the organo groups can be replaced under the most favorable conditions; an elevated temperature (50–60° C.) and a prolonged reaction period (16 to 20 hours) are preferred for complete reaction.

The use of fluorine, however, introduces difficulties of a type opposite to those encountered with iodine. Because of the extremely high reactivity of elementary fluorine and the difficulties of reaction control resulting from its use, it is preferred to use the hydrohalogenation reaction or the redistribution process for the preparation of fluorine derivatives of organotin manganese pentacarbonyl.

When the halogen reactant is hydrogen halide, the foregoing considerations are generally applicable, the reaction conditions being modified where necessary, however, to take account of the reduced reactivity of the hydrogen halide as compared with the free halogen. In general, the use of an excess of hydrogen halide tends to favor complete replacement, and the use of a deficiency, partial replacement, of the organo groups of the organotin manganese pentacarbonyl with the halogen atoms. Thus, the reaction of a excess hydrogen chloride with diphenyltin bis(manganese pentacarbonyl) results in the formation of dichlorotin bis(manganese pentacarbonyl), whereas a mixture consisting largely of phenylchlorotin bis(manganese pentacarbonyl) is obtained when an excess of the carbonyl reactant is used. Similar considerations apply to the other hydrogen halide reactants.

In this reaction, a solvent is desirable but not essential. Any solvent, inert to the reactants and products, may be employed, but halohydrocarbons are generally preferred because of their solvent power for the reactants. Carbon tetrachloride and methylene dichloride are particularly preferred because of the ready solubility of the reactants therein, their volatility and consequent ease of separation from the reaction products, and the ease with which the solvents may be made and kept anhydrous.

The halogenation reaction temperature can vary from below room temperature (as noted above) to the normal reflux temperature of the solvent or even higher if pressure is employed. Therefore, in general, temperatures ranging from about 0° to about 80° C. can be used. If no solvent is used, the upper temperature limit is set by the decomposition temperatures of the reactants and products. Accordingly, an upper limit of about 90° C. is recommended in the absence of a solvent.

The operating pressure employed may range from 10 mm. of mercury or less to 100 atmospheres or more but, in general, normal atmospheric pressure is wholly satisfactory.

The foregoing reactions proceed smoothly and rapidly under the prescribed conditions, reaching completion for the lower alkyl derivatives in 30 minutes to 1 hour. Somewhat longer reaction times are desirable for the higher alkyl derivatives.

REDISTRIBUTION PROCESS

In the redistribution process, as indicated above, reaction occurs between an organotin manganese pentacarbonyl and a halo- (or organohalo-)tin manganese pentacarbonyl. In this reaction, there is an exchange between one or more of the organo groups of the organotin manganese pentacarbonyl and a like number of the halo radicals of the halotin compound. This reaction is normally carried out by combining the reactants in the absence of any solvent.

The product of the redistribution reaction is intermediate in its content of both halo and organo radicals with respect to the two reactants. Consequently, the specific product mixture obtained depends upon the nature of the reactants and upon the relative amounts used. Thus, in a reaction between triphenyltin manganese pentacarbonyl and trichlorotin manganese pentacarbonyl, an excess of the former would favor the formation of diphenylchlorotin manganese pentacarbonyl, and an excess of the latter, the formation of phenyldichlorotin manganese pentacarbonyl.

The redistribution reaction proceeds more slowly than the halogenation reaction and requires the application of a higher temperature. Temperatures ranging from 125° to 175° or above may be employed, under which conditions the preferred reaction time is from ½ to 10 hours.

PREPARATION OF REACTANTS

The organotin manganese carbonyl reactants required both for the halogenation process and for the redistribution process are prepared by treating an alkali or alkaline earth metal manganese pentacarbonyl with an organotin halide. Thus, for example, triphenyltin manganese pentacarbonyl may be obtained as follows.

Prepare a tetrahydrofuran solution of sodium manganese pentacarbonyl from 19.5 grams of manganese pentacarbonyl dimer and sodium amalgam (5 grams of sodium and 500 grams of mercury) in about 300 milliliters of tetrahydrofuran. Stir the reaction mixture at room temperature for 30 minutes, then separate the mercury. Add 38.0 grams of triphenyltin chloride and reduce the reaction mixture to about half its volume by distillation. Pour the mixture into ice water and filter off the solid. Dry the solid and extract several times with n-hexane at reflux. Concentrate the combined extracts to about 70 milliliters. Cool, filter off the white crystals which separate, and dry at room temperature and under reduced pressure to obtain an excellent yield of triphenyltin manganese pentacarbonyl.

Modifications in the above procedure to make the other organotin manganese carbonyl reactants used in the process of this invention will now be apparent to those skilled in the art.

The invention will be more fully understood by reference to the following set of illustrative examples in which all parts and percentages are by weight.

*Example I.—Trichlorotin Manganese Pentacarbonyl*

Chlorine was bubbled through a solution of 10.0 grams (0.0184 mole) of triphenyltin manganese pentacarbonyl in about 60 cc. of carbon tetrachloride at a moderate rate for 25 minutes. A white solid precipitated. Excess chlorine was removed under reduced pressure. The resulting solution was heated to reflux and filtered while hot. The filtrate was concentrated until white needles began to separate out. The needles were filtered off and dried to give 4.68 grams (61%) of trichlorotin manganese pentacarbonyl, melting at 168° C. with extensive decomposition. The product was only slightly soluble in acetone, methanol and benzene.

*Example II.—Tribromotin Manganese Pentacarbonyl*

A solution of 4.45 grams (0.028 mole) of bromine in about 30 milliliters of carbon tetrachloride was added during 35 minutes to a solution of 5.0 grams (0.009 mole) of triphenyltin manganese pentacarbonyl in about 20 milliliters of carbon tetrachloride. The excess solvent was evaporated under reduced pressure until about 15 milliliters of product remained. This was chilled by Dry Ice and the white crystals were filtered off and dried to give 4.35 grams (86%) of tribromotin manganese pentacarbonyl melting at 142 to 144° C. The product was recrystallized from a mixture of methylene dichloride and carbon tetrachloride. The melting point of the purified product was 145 to 147° C.

*Analysis.*—Calculated for $C_5Br_3O_5MnSn$: C, 10.8; Br, 43.3. Found: C, 11.5; Br, 42.8.

Example III.—Phenyldichlorotin Manganese Pentacarbonyl

Anhydrous hydrogen chloride was bubbled through a solution of 0.2 gram (0.00368 mole) of triphenyltin manganese pentacarbonyl in about 125 milliliters of carbon tetrachloride for 45 minutes while maintaining the reaction temperature between 0 and 5° C. The solvent was evaporated under a pressure of 45 mm. of mercury and at a temperature of about 10 to 15° C. The white residue was extracted with refluxing n-hexane and filtered while hot. On cooling to room temperature, there deposited from the solution 1.45 grams (85%) of phenyldichlorotin manganese pentacarbonyl, melting at 83–85° C.

Analysis.—Calculated for $C_{11}H_5Cl_2O_5MnSn$: C, 28.6; H, 1.1; Cl, 15.4. Found: C, 28.2; H, 1.2; Cl, 14.8.

By using techniques similar to the above, one can prepare a variety of organohalotin manganese pentacarbonyls from the corresponding triorganotin manganese pentacarbonyls. For example, when the procedures of Examples I and II are repeated using triethyltin manganese pentacarbonyl in place of triphenyltin manganese pentacarbonyl, the products are the same as before, namely, trichlorotin manganese pentacarbonyl and tribromotin manganese pentacarbonyl, respectively.

Similarly, when the procedure of Example III is repeated using tri-n-octyltin manganese pentacarbonyl and tribenzyltin manganese pentacarbonyl in place of triphenyltin manganese pentacarbonyl, the products are, respectively, n-octyl dichlorotin manganese pentacarbonyl and benzyl dichlorotin manganese pentacarbonyl.

By similar techniques, one can prepare the following compounds from the corresponding triorganotin manganese pentacarbonyls: ethyl dichlorotin manganese pentacarbonyl, o-tolyl dichlorotin manganese pentacarbonyl, 2,5-xylyl dichlorotin manganese pentacarbonyl, cyclohexyl dichlorotin manganese pentacarbonyl and phenethyl dichlorotin manganese pentacarbonyl.

Example IV.—Phenyldibromotin Manganese Pentacarbonyl

A solution of 2.96 grams (0.0184 mole) of bromine in about 20 milliliters of carbon tetrachloride was added at room temperature during 1 hour to a stirred solution of 5.0 grams (0.009 mole) of triphenyltin manganese pentacarbonyl in 80 milliliters of carbontetrachloride. The end point of the reaction could be detected by a change in color from yellow to orange. The residue, after evaporation of the solvent, was crystallized from n-hexane to give 4.28 grams (85%) of phenyl dibromotin manganese pentacarbonyl melting at 96–98° C.

When the procedure of Example IV is repeated using iodine in place of bromine, the product is phenyl diiodotin manganese pentacarbonyl.

Example V.—Diphenylchlorotin Manganese Pentacarbonyl

A mixture of 4.2 grams (0.01 mole) of trichlorotin manganeses pentacarbonyl and 11.0 grams (0.02 mole) of triphenyltin manganese pentacarbonyl was heated at 148° C. for 45 minutes. The reaction mixture was crystallized from n-hexane to give 13.0 grams (85%) of diphenylchlorotin manganese pentacarbonyl, melting at 89–92° C. The analytical sample—which melted at 97–98° C.—had been crystallized two additional times from n-hexane.

Analysis.—Calculated for $C_{17}H_{10}O_5ClMnSn$: C, 40.6; H, 2.0. Found: C, 40.9; H, 2.1.

Example VI.—Diphenylbromotin Manganese Pentacarbonyl

A mixture of 1.5 grams (0.00283 mole) of phenyldibromotin manganese pentacarbonyl and 1.55 grams (0.00283 mole) of triphenyltin manganese pentacarbonyl was heated at about 150° C. for 5 hours. The crude product was crystallized from n-hexane to give 2.22 grams (73%) of diphenylbromotin manganese pentacarbonyl, melting at 83–88° C. Recrystallization from n-hexane gave 1.7 grams (56%) of pure product, melting at 96–96.5° C.

Analysis.—Calculated for $C_{17}H_{10}O_5BrMnSn$: C, 37.27; H, 1.84; Br, 14.59. Found: C, 37.47, 37.27; H, 1.83, 1.97; Br, 14.73, 14.66.

By using techniques similar to that of Example VI, one can prepare a variety of dialkyl halotin manganese pentacarbonyls from the corresponding organo-, halo- and/or organohalotin manganese pentacarbonyls. For example, when the procedure of Example VI is repeated using phenyl difluorotin manganese pentacarbonyl in place of phenyl dibromotin manganese pentacarbonyl, the product is diphenyl fluorotin manganese pentacarbonyl.

Similarly, when the procedure of Example VI is repeated using trioctadecyltin manganese pentacarbonyl in place of triphenyltin manganese pentacarbonyl and octadecyl diiodotin manganese pentacarbonyl in place of phenyldibromotin manganese pentacarbonyl, the product is dioctadecyl iodotin manganese pentacarbonyl.

By similar techniques, one can prepare the following compounds from the corresponding triorganotin manganese pentacarbonyls and the corresponding organodihalotin manganese pentacarbonyls, respectively: diphenyliodotin manganese pentacarbonyl, dimethylbromotin manganese pentacarbonyl, didodecylchlorotin manganese pentacarbonyl, di-p-tolylfluorotin manganese pentacarbonyl and di-2,4-xylylbromotin manganese pentacarbonyl.

Example VII.—Dichlorotin Bis(Manganese Pentacarbonyl)

Anhydrous hydrogen chloride was passed through a solution of 2.0 grams (0.003 mole) of diphenyltin bis(manganese pentacarbonyl) in about 75 milliliters of methylene chloride for 30 minutes at room temperature. The solvent was evaporated and the residue was recrystallized from ethanol to give 1.2 grams (69%) of dichlorotin bis(manganese pentacarbonyl), in the form of white needles, melting at 143–144° C.

The following compounds may be prepared by the use of methods similar to that of Example VII: difluorotin bis(manganese pentacarbonyl), dibromotin bis(manganese pentacarbonyl) and diiodotin bis(manganese pentacarbonyl). Thus, when the procedure of Example VII is repeated using diethyltin bis(manganese pentacarbonyl) in place of diphenyltin bis(manganese pentacarbonyl) and anhydrous hydrogen fluoride in place of anhydrous hydrogen chloride, the product is difluorotin bis(manganese pentacarbonyl). Similarly, by using any desired dialkyltin bis(manganese pentacarbonyl) in place of diphenyltin bis(manganese pentacarbonyl) and anhydrous hydrogen bromide or hydrogen iodide in place of anhydrous hydrogen chloride, one obtains dibromotin- or diiodotin bis(manganese pentacarbonyl), respectively.

A feature of the use of the compounds of this invention as antiknock agents is that in a sense they act (by virtue of their halogen content) as their own corrective agents with respect to the reduction of engine wear, exhaust valve life, and combustion chamber deposits. Furthermore, although the reason therefor is not known with certainty, the increased reduction in engine wear and the improvement in exhaust valve life obtained with the use of these compounds are believed to be due to the co-presence of tin and halogen with manganese in a single molecule.

The use of such manganese-tin-halogen compounds in conjunction with organic lead compounds results in another type of corrective action. Not only are there improvements in engine wear, exhaust valve life and combustion chamber deposits, as noted above, but there is a marked increase in antiknock efficiency.

As mentioned above, the compounds of this invention are useful in combatting fungi when they are applied to the locus of the fungi. For this utility, the compounds of this invention serve as the active ingredients and normally are mixed with conditioning agents such as pest control adjuvants, extenders and modifiers, dispersants, dispersing agents, surface active agents, etc. The purpose of these conditioning agents is to extend the active ingredient to assure its efficacious penetration into or application onto the locus being treated and to adapt the active ingredient for ready and efficient application to pests and to the loci of the fungi using conventional equipment. In general, such formulations comprise both the liquid and solid types as well as the "aerosol" type of formulation. The liquid type of formulation can have water and organic solvent, oil-water emulsion or the like as the conditioning agent. The liquid ingredient of the formulation may further contain a surface active agent such as a detergent, a soap or another wetting agent.

The active ingredients can also be dispersed or suspended in various organic solvents such as alcohols; ketones; hydrocarbons; petroleum cuts, such as kerosene; dimethyl formamide and the like. In this case a surface active dispersing agent is usually present to provide ready dispersibility with water.

As indicated above, a considerable variety of organotin manganese compounds falls within the scope of this invention. Examples of these compounds are the following: dimethylfluorotin manganese pentacarbonyl, di-n-octyl-chlorotin manganese pentacarbonyl, diphenylbromotin manganese pentacarbonyl, p-ethylphenyliodotin manganese pentacarbonyl, cyclopentadienyl difluorotin manganese pentacarbonyl, ethyldichlorotin manganese pentacarbonyl, dodecyldibromotin manganese pentacarbonyl, tolyldiiodotin manganese pentacarbonyl, dibenzylfluorotin manganese pentacarbonyl, bis-methylcyclopentadienyl chlorotin manganese pentacarbonyl, di-n-butyliodotin manganese pentacarbonyl, octadecyldifluorotin manganese pentacarbonyl, metaxylyldichlorotin manganese pentacarbonyl, phenethyldibromotin manganese pentacarbonyl, octylcyclopentadienyl diiodotin manganese pentacarbonyl, methyl-n-butylfluorotin manganese pentacarbonyl, ethyldodecylchlorotin manganese pentacarbonyl, octadecylbenzylbromotin manganese pentacarbonyl, phenylcyclopentadienyliodotin manganese pentacarbonyl, trifluorotin manganese pentacarbonyl, trichlorotin manganese pentacarbonyl and tribromotin manganese pentacarbonyl.

As mentioned above, two general processes, namely, the "halogenation-hydrohalogenation" reaction and the redistribution reaction, are available for the synthesis of the valuable compounds of this invention. These two reactions have one reactant in common, i.e., triphenyl (or other triorgano) tin manganese pentacarbonyl. This starting material is made, as shown in detail above, by the reaction of sodium (or potassium) manganese pentacarbonyl with phenyl (or other organo) tin halide. The reaction is carried out in tetrahydrofuran or other suitable solvent. After the reaction is complete, the solvent is evaporated under reduced pressure and the residue is extracted repeatedly with refluxing n-hexane. The extracts are combined, filtered, concentrated and cooled to crystallize the triorganotin manganese pentacarbonyl, which is then ready for use in the above reactions.

Illustrative of these reactants are tri-n-butyltin manganese pentacarbonyl, triphenyltin, manganese pentacarbonyl, tribenzyltin manganese pentacarbonyl, tricyclopentadienyltin manganese pentacarbonyl, diethyltin bis-(manganese pentacarbonyl), didodecyltin bis(manganese pentacarbonyl), di-metaxylyltin bis(manganese pentacarbonyl) and di(octadecylcyclopentadienyl)tin bis(manganese pentacarbonyl).

In the "halogenation-hydrohalogenation" reaction, the second reactant is halogen or hydrogen halide. Illustrative of these reactants are: chlorine, bromine, iodine, hydrogen fluoride, hydrogen chloride, hydrogen bromide and hydrogen iodide.

In the redistribution reaction, the second reactant is a trihalotin- or organodihalotin manganese pentacarbonyl.

These reactants are prepared as described above by the reaction of the appropriate triorganotin manganese pentacarbonyl with the appropriate halogen, the reaction conditions being determined by the nature of the particular compound required. Illustrative of these reactants are: trifluorotin manganese pentacarbonyl, trichlorotin manganese pentacarbonyl, tribromotin manganese pentacarbonyl, triiodotin manganese pentacarbonyl, isoamyldifluorotin manganese pentacarbonyl, cyclopentyldichlorotin manganese pentacarbonyl, phenyldibromotin manganese pentacarbonyl and orthoxylyldiiodotin manganese pentacarbonyl.

The reactants used in the preparation of the compounds of this invention can be employed in a wide variety of proportions. In the halogenation reaction, the proportions can range from stoichiometric to a 100% or greater excess of halogen or hydrogen halide. In the redistribution reaction, the proportions can range from a 100% or greater excess of the triorganotin manganese pentacarbonyl to a 100% or greater excess of the halogenated organotin manganese pentacarbonyl. Usually the reactants are employed in proportions corresponding approximately to stoichiometric equivalents but a moderate excess of one reactant or the other is often used to bring about an increased reaction rate.

The solvents employed in the halogenation reaction of this invention are halohydrocarbons such as ethyl chloride, the chlorofluoromethanes, bromobenzene, alpha-trifluorotoluene and the like. The preferred solvents are carbon tetrachloride and methylene dichloride because of their relatively high solubility for the reactants, their relatively high resistance to halogenation and their volatility, the latter being of particular value in that it facilitates a separation of the solvent and the recovery of the product. In the redistribution reaction, no solvent is needed or desired since the reactants are mixed directly and reacted at elevated temperature.

The halogenation reaction of this invention may be carried out at any temperature within the liquid range of the solvent. Room temperature is perfectly satisfactory in most instances.

The redistribution reaction can be carried out at any temperature between the lowest temperature at which reaction is perceptible and the lowest temperature at which appreciable decomposition of the reactants or products occurs. A temperature in the range of 135–160° C. is preferred because in this range reaction rate is satisfactory and decomposition is not excessive.

Because the reactions ordinarily proceed at satisfactory rates under normal pressure conditions, atmospheric pressure is usually satisfactory but pressures ranging from 10 mm. of mercury to 100 atmospheres may be used if desired.

The reactions of this invention may be carried out under any atmosphere inert to the products. The compounds are stable on exposure to dry air, which can thus be used with safety. Other suitable protective atmospheres include dry nitrogen, helium, neon, argon, krypton and xenon.

The normally solid compounds of this invention are soluble in and can be purified by recrystallization from a variety of organic solvents. Specifically, simple aromatic solvents such as benzene or toluene, simple aliphatic solvents such as hexane, alcohols such as ethanol, and halohydrocarbons such as methylene chloride and carbon tetrachloride and their mixtures are found to be satisfactory.

As stated above, the compounds of this invention are useful as antiknock agents for internal combustion engine fuels. They may suitably be employed in concentrations varying from that corresponding to about 0.005 gram of manganese per gallon to their saturation concentrations at ambient temperature. They are highly effective agents and their versatility is shown by the fact that they can be added to the fuels either alone or in combination with tetraethyllead. In this combination the antiknock effects of the two components are synergistic, that is, the combination produces a greater rise in octane number than that corresponding to the sum of the effects produced by the two components used separately.

I claim:
1. A compound represented by the general formula

$$R_mX_{4-m-p}Sn[Mn(CO)_5]_p$$

wherein R is a hydrocarbon radical containing up to about 18 carbon atoms and is selected from the group consisting of alkyl, aryl, cycloalkyl, aralkyl, and alkaryl radicals; X is a halogen; m is an integer from 1 to 2, inclusive; and p is 1 when m is 2 and is an integer from 1 to 2, inclusive, when m is 1.
2. The compound of claim 1 wherein X is chlorine.
3. The compound of claim 1 wherein X is bromine.
4. Phenyldichlorotin manganese pentacarbonyl.
5. Phenyldibromotin manganese pentacarbonyl.
6. Diphenylchlorotin manganese pentacarbonyl.
7. Diphenylbromotin manganese pentacarbonyl.
8. The method of preparing a compound of claim 1 which comprises reacting a compound represented by the general formula $$R_{m+1}Sn[Mn(CO)_5]_{3-m}$$

wherein R is a hydrocarbon radical containing up to about 18 carbon atoms and is selected from the group consisting of alkyl, aryl, cycloalkyl, aralkyl and alkaryl radicals, and m is an integer from 1 to 2, inclusive, with a reactant selected from the group consisting of halogens having atomic numbers from 17 to 53, inclusive, and hydrogen halides.
9. The method of claim 8 wherein said reactant is chlorine.
10. The method of claim 8 wherein said reactant is hydrogen chloride.
11. The method of claim 8 wherein the reaction is carried out in an inert organic solvent.
12. The method of claim 8 wherein the reaction is carried out in a chloroalkane as a solvent.

13. The method of preparing a compound represented by the general formula $$R_nX_{3-n}SnMn(CO)_5$$

which comprises heating, to a temperature sufficient to bring about reaction, a compound represented by the general formula $$X_3SnMn(CO)_5$$

with a compound represented by the general formula $$R_3SnMn(CO)_5,$$

wherein R is a hydrocarbon radical containing up to about 18 carbon atoms and is selected from the group consisting of alkyl, aryl, cycloalkyl, aralkyl and alkaryl radicals, X is a halogen, and n is an integer from 1 to 2, inclusive.

14. The method of preparing a compound represented by the general formula $$R_2XSnMn(CO)_5$$

which comprises heating, to a temperature sufficient to bring about reaction, a compound represented by the general formula $$RX_2SnMn(CO)_5$$

with a compound represented by the general formula $$R_3SnMn(CO)_5$$

wherein R is a hydrocarbon radical containing up to about 18 carbon atoms and is selected from the group consisting of alkyl, aryl, cycloalkyl, aralkyl and alkaryl radicals and X is a halogen.
15. The method of claim 13 wherein X is chlorine.
16. The method of claim 13 wherein X is bromine.
17. The method of claim 14 wherein X is chlorine.
18. The method of claim 14 wherein X is bromine.

References Cited in the file of this patent
UNITED STATES PATENTS

| | | |
|---|---|---|
| 2,434,578 | Miller | Jan. 13, 1948 |
| 2,942,936 | Coffield | June 28, 1960 |
| 2,967,087 | Coffield | Jan. 3, 1961 |